United States Patent
Hauck (10) Patent No.: US 8,040,330 B2
(45) Date of Patent: Oct. 18, 2011

(54) UNTETHERED STYLUS EMPOLYING MULTIPLE REFERENCE FREQUENCY COMMUNICATION

(75) Inventor: Karl P. Hauck, Pembroke, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 963 days.

(21) Appl. No.: 11/617,312

(22) Filed: Dec. 28, 2006

(65) Prior Publication Data

US 2008/0156546 A1 Jul. 3, 2008

(51) Int. Cl.
*G06F 3/033* (2006.01)

(52) U.S. Cl. .................... 345/179; 178/19.01

(58) Field of Classification Search ........... 345/179; 178/19.01
See application file for complete search history.

(56) References Cited

U.S. PATENT DOCUMENTS

| | | | |
|---|---|---|---|
| 3,072,849 A | 1/1963 | Firestone |
| 3,617,922 A | 11/1971 | Bernstein |
| 3,983,322 A | 9/1976 | Rodgers |
| 4,029,869 A | 6/1977 | Ingram et al. |
| 4,289,926 A | 9/1981 | Kobayashi |
| 4,289,927 A | 9/1981 | Rodgers |
| 4,353,552 A | 10/1982 | Pepper |
| 4,360,790 A | 11/1982 | Heise |
| 4,455,451 A | 6/1984 | Kriz |
| 4,473,717 A | 9/1984 | Parnell et al. |
| 4,672,154 A | 6/1987 | Rodgers et al. |
| 4,686,332 A | 8/1987 | Greanias et al. |
| 4,786,765 A | 11/1988 | Yamanami et al. |
| 4,848,496 A | 7/1989 | Murakami et al. |
| 4,878,553 A | 11/1989 | Yamanami et al. |
| 4,893,115 A | 1/1990 | Blanchard |
| 4,902,858 A | 2/1990 | Yamanami et al. |
| 4,948,926 A | 8/1990 | Murakami et al. |
| 4,956,526 A | 9/1990 | Murakami et al. |
| 4,988,837 A | 1/1991 | Murakami et al. |
| 4,999,461 A | 3/1991 | Murakami et al. |
| 5,028,745 A | 7/1991 | Yamanami et al. |

(Continued)

FOREIGN PATENT DOCUMENTS

CN 1512345 7/2004

(Continued)

OTHER PUBLICATIONS

U.S. Appl. No. 11/557,829, entitled "Touch Location Sensing System and Method Employing Sensor Data Fitting to a Predefined Curve," filed Nov. 8, 2006.

(Continued)

*Primary Examiner* — Lun-Yi Lao
*Assistant Examiner* — Jarurat Suteerawongsa
(74) *Attorney, Agent, or Firm* — Steven A. Bern (57) ABSTRACT

An untethered stylus is configured to cooperate with a location sensing device that generates a drive signal. The stylus includes transceiver circuitry disposed in a housing, which is configured to receive the drive signal and transmit a stylus signal for reception by the location sensor. Energy circuitry is disposed in the housing and energized by the drive signal. A reference frequency generator, disposed in the housing and coupled to the transceiver circuitry and energy circuitry, is configured to generate a number of reference frequencies based on a source frequency of the drive signal, the reference frequencies indicative of a number of stylus states and synchronized to the source frequency of the drive signal. The transceiver circuitry is configured to mix the reference frequencies with the stylus signal.

21 Claims, 6 Drawing Sheets

U.S. PATENT DOCUMENTS

| | | | |
|---|---|---|---|
| RE33,740 E | 11/1991 | Taguchi et al. | |
| RE33,805 E | 1/1992 | Yamanami et al. | |
| 5,083,118 A | 1/1992 | Kazama | |
| 5,122,623 A | 6/1992 | Zank et al. | |
| 5,130,500 A | 7/1992 | Murakami et al. | |
| 5,138,118 A | 8/1992 | Russell | |
| RE34,187 E | 3/1993 | Yamanami et al. | |
| 5,191,175 A | 3/1993 | Protheroe et al. | |
| 5,194,819 A | 3/1993 | Briefer | |
| 5,218,173 A | 6/1993 | Garwin et al. | |
| 5,218,174 A | 6/1993 | Gray et al. | |
| 5,305,017 A | 4/1994 | Gerpheide | |
| 5,337,040 A | 8/1994 | Kind | |
| 5,369,227 A | 11/1994 | Stone | |
| 5,373,118 A | 12/1994 | Watson | |
| 5,374,787 A | 12/1994 | Miller | |
| 5,381,137 A | 1/1995 | Ghaem et al. | |
| 5,402,151 A | 3/1995 | Duwaer | |
| 5,414,227 A | 5/1995 | Schubert et al. | |
| 5,420,379 A | 5/1995 | Zank et al. | |
| 5,420,804 A | 5/1995 | Tanaka et al. | |
| 5,475,401 A | 12/1995 | Verrier et al. | |
| 5,486,847 A | 1/1996 | Ranf et al. | |
| 5,506,375 A | 4/1996 | Kikuchi | |
| 5,528,002 A | 6/1996 | Katabami | |
| 5,530,210 A | 6/1996 | Fukuzaki | |
| 5,557,076 A | 9/1996 | Wieczorek et al. | |
| 5,565,658 A | 10/1996 | Gerpheide et al. | |
| 5,571,997 A | 11/1996 | Gray et al. | |
| 5,594,215 A | 1/1997 | Jeng | |
| 5,608,390 A | 3/1997 | Gasparik | |
| 5,619,431 A | 4/1997 | Oda | |
| 5,629,500 A * | 5/1997 | Fukuzaki et al. | 178/19.07 |
| 5,633,471 A | 5/1997 | Fukushima | |
| 5,644,108 A | 7/1997 | Katsurahira et al. | |
| 5,661,269 A * | 8/1997 | Fukuzaki et al. | 178/19.06 |
| 5,675,130 A | 10/1997 | Sekizawa | |
| 5,682,019 A | 10/1997 | Katsurahira et al. | |
| 5,691,512 A | 11/1997 | Obi | |
| 5,691,513 A | 11/1997 | Yamamoto et al. | |
| 5,693,914 A | 12/1997 | Ogawa | |
| 5,706,000 A | 1/1998 | Fukuzaki et al. | |
| 5,714,984 A * | 2/1998 | Fukuzaki et al. | 345/174 |
| 5,730,165 A | 3/1998 | Philipp | |
| 5,748,110 A | 5/1998 | Sekizawa et al. | |
| 5,751,229 A | 5/1998 | Funahashi | |
| 5,763,839 A | 6/1998 | Funahashi et al. | |
| 5,790,106 A | 8/1998 | Hirano | |
| 5,792,997 A | 8/1998 | Fukuzaki | |
| 5,793,360 A | 8/1998 | Fleck et al. | |
| 5,815,091 A | 9/1998 | Dames et al. | |
| 5,861,583 A | 1/1999 | Schediwy et al. | |
| 5,898,136 A | 4/1999 | Katsurahira | |
| 5,914,708 A | 6/1999 | LaGrange et al. | |
| 5,914,710 A * | 6/1999 | Chen et al. | 345/179 |
| 5,945,980 A | 8/1999 | Moissev et al. | |
| 5,973,677 A | 10/1999 | Gibbons | |
| 5,986,646 A | 11/1999 | Chen et al. | |
| 6,002,387 A | 12/1999 | Ronkka et al. | |
| 6,005,555 A | 12/1999 | Katsurahira et al. | |
| 6,020,849 A | 2/2000 | Fukuzaki | |
| 6,064,374 A | 5/2000 | Fukuzaki | |
| 6,075,468 A | 6/2000 | Sugiyama | |
| 6,118,435 A | 9/2000 | Fujita et al. | |
| 6,133,906 A | 10/2000 | Geaghan | |
| 6,137,427 A | 10/2000 | Binstead | |
| 6,178,818 B1 | 1/2001 | Plöchinger | |
| 6,215,476 B1 | 4/2001 | Depew et al. | |
| 6,249,234 B1 | 6/2001 | Ely et al. | |
| 6,307,385 B1 | 10/2001 | Tardif et al. | |
| 6,335,727 B1 | 1/2002 | Morishita et al. | |
| 6,380,931 B1 | 4/2002 | Gillespie et al. | |
| 6,433,781 B1 | 8/2002 | Oda et al. | |
| 6,466,036 B1 | 10/2002 | Philipp | |
| 6,476,799 B1 | 11/2002 | Lee et al. | |
| 6,546,107 B1 | 4/2003 | Bohnke | |
| 6,549,096 B2 | 4/2003 | Groves et al. | |
| 6,576,850 B2 | 6/2003 | Fukushima et al. | |
| 6,587,098 B2 | 7/2003 | Teterwak | |
| RE38,286 E | 10/2003 | Flowers | |
| 6,667,740 B2 | 12/2003 | Ely et al. | |
| 6,670,561 B2 | 12/2003 | Aoki | |
| 6,690,156 B1 | 2/2004 | Weiner et al. | |
| 6,762,752 B2 | 7/2004 | Perski et al. | |
| 6,790,160 B2 | 9/2004 | Kato et al. | |
| 6,927,762 B2 * | 8/2005 | Lin | 345/174 |
| 6,970,160 B2 | 11/2005 | Mulligan et al. | |
| 7,019,672 B2 | 3/2006 | Ely | |
| 7,030,782 B2 | 4/2006 | Ely et al. | |
| 7,079,118 B2 | 7/2006 | Benard et al. | |
| 7,241,954 B2 | 7/2007 | Kanai | |
| 7,265,303 B2 | 9/2007 | Thacker | |
| 7,411,584 B2 | 8/2008 | Hill et al. | |
| 7,436,164 B2 | 10/2008 | Vos | |
| 7,453,444 B2 | 11/2008 | Geaghan | |
| 7,474,300 B2 | 1/2009 | Katsurahira et al. | |
| 7,787,259 B2 | 8/2010 | Free et al. | |
| 7,812,268 B2 | 10/2010 | Ely | |
| 7,907,130 B2 | 3/2011 | Ely | |
| 2002/0050983 A1 | 5/2002 | Liu et al. | |
| 2003/0001692 A1 | 1/2003 | Chiu et al. | |
| 2003/0067447 A1 | 4/2003 | Geaghan et al. | |
| 2003/0090347 A1 | 5/2003 | Losehand et al. | |
| 2004/0004488 A1 | 1/2004 | Baxter | |
| 2004/0092229 A1 | 5/2004 | Hessel | |
| 2004/0095333 A1 | 5/2004 | Morag et al. | |
| 2004/0104826 A1 | 6/2004 | Philipp | |
| 2004/0155871 A1 | 8/2004 | Perski et al. | |
| 2004/0233178 A1 | 11/2004 | Silk et al. | |
| 2005/0083307 A1 | 4/2005 | Aufderheide et al. | |
| 2005/0099188 A1 | 5/2005 | Baxter | |
| 2005/0128191 A1 | 6/2005 | Katsurahira et al. | |
| 2005/0146513 A1 | 7/2005 | Hill et al. | |
| 2005/0162411 A1 | 7/2005 | Berkel van | |
| 2005/0171714 A1 | 8/2005 | Ely et al. | |
| 2005/0174259 A1 | 8/2005 | Ely | |
| 2006/0016800 A1 | 1/2006 | Paradiso et al. | |
| 2006/0022959 A1 | 2/2006 | Geaghan | |
| 2006/0038628 A1 | 2/2006 | Khannur | |
| 2006/0114247 A1 | 6/2006 | Brown | |
| 2006/0125472 A1 | 6/2006 | Howard et al. | |
| 2007/0164833 A1 | 7/2007 | Kottschlag | |
| 2008/0106520 A1 | 5/2008 | Free et al. | |
| 2008/0116990 A1 | 5/2008 | Rokhsaz | |
| 2008/0128180 A1 * | 6/2008 | Perski et al. | 178/18.03 |
| 2008/0142281 A1 | 6/2008 | Geaghan | |
| 2008/0149401 A1 | 6/2008 | Hagen et al. | |
| 2008/0149402 A1 | 6/2008 | Vos | |
| 2008/0150550 A1 | 6/2008 | Vos | |
| 2008/0150658 A1 | 6/2008 | Vos | |
| 2008/0150917 A1 | 6/2008 | Libbey et al. | |
| 2008/0150918 A1 | 6/2008 | Hagen et al. | |
| 2008/0158165 A1 | 7/2008 | Geaghan et al. | |
| 2009/0040193 A1 | 2/2009 | Geaghan | |
| 2009/0134960 A1 | 5/2009 | Larson et al. | |
| 2010/0188832 A1 | 7/2010 | Free et al. | |

FOREIGN PATENT DOCUMENTS

| | | |
|---|---|---|
| DE | 33 42 522 | 6/1985 |
| DE | 298 19 250 | 1/2000 |
| EP | 0 549 956 A1 | 7/1993 |
| EP | 0 607 694 B1 | 3/2000 |
| JP | 07-319601 | 12/1995 |
| JP | 08-179871 | 7/1996 |
| JP | 9046135 | 2/1997 |
| JP | 10-011206 | 1/1998 |
| JP | 11-024830 | 1/1999 |
| JP | 11-073270 | 1/1999 |
| JP | 11-249798 | 9/1999 |
| JP | 2002-007054 | 1/2002 |
| JP | 2002-297300 | 10/2002 |
| JP | 2004-062729 | 2/2004 |
| JP | 2004-185153 | 7/2004 |
| KR | 10-0601151 B1 | 7/2006 |
| KR | 10-0601152 B1 | 7/2006 |

| | | |
|---|---|---|
| WO | WO 92/08206 | 5/1992 |
| WO | WO 93/08551 | 4/1993 |
| WO | WO 96/18171 | 6/1996 |
| WO | WO 02/103622 A2 | 12/2002 |
| WO | WO 2004/021328 A2 | 3/2004 |
| WO | WO 2004/036147 | 4/2004 |
| WO | WO 2004/040240 A1 | 5/2004 |
| WO | WO 2004/070396 A2 | 8/2004 |
| WO | WO 2006/133159 A2 | 12/2006 |

OTHER PUBLICATIONS

U.S. Appl. No. 11/613,571 entitled "Oscillator Circuit for Use in an Untethered Stylus," filed Dec. 20, 2006.
Paul Lorrain and Dale Corson, *Electromagnetic Fields and Waves*, 2d ed. W.H. Freeman and Company of San Francisco, CA (1970), pp. 150-152.

* cited by examiner

UNTETHERED STYLUS EMPOLYING MULTIPLE REFERENCE FREQUENCY COMMUNICATION

The present invention relates generally to location sensing systems and methods and, more particularly, to location sensing systems and methods that employ an untethered stylus as a user input implement.

BACKGROUND

Personal computing systems of varying type and configuration typically provide one or more user interface devices to facilitate user interaction with such computing systems. Well known user interface devices include a keyboard, mouse, trackball, joystick, and the like. Various types of personal computing devices, such as tablet PCs, provide a pen apparatus that can be manipulated by the user, much in the same way as a pencil or ink pen.

Conventional computing devices that provide for user input via a pen or other pointer implement typically employ an electromagnetic inductive system. The electromagnetic inductive system usually comprises an electromagnetic pen or pointer apparatus and a digitizer in the form of a tablet. Changes in pen location relative to the digitizer's sensing surface are detected and location computations are made to determine the coordinates of the pen.

SUMMARY OF THE INVENTION

The present invention is directed to effecting communication of information between an untethered stylus and a location sensing device. According to embodiments of the present invention, an untethered stylus is configured to cooperate with a location sensor, the location sensor configured to generate a drive signal. The stylus includes a housing and transceiver circuitry disposed in the housing. The transceiver circuitry is configured to receive the drive signal and transmit a stylus signal for reception by the location sensor. Energy circuitry is disposed in the housing and energized by the drive signal.

A reference frequency generator is disposed in the housing and coupled to the transceiver circuitry and energy circuitry. The reference frequency generator is configured to generate a plurality of reference frequencies based on a source frequency of the drive signal, the plurality of reference frequencies indicative of a plurality of stylus states and synchronized to the source frequency of the drive signal. The transceiver circuitry is configured to mix the plurality of reference frequencies with the stylus signal. The transceiver circuitry may be configured to modulate the stylus signal with the plurality of reference frequencies.

The stylus may further include switch circuitry supported by the housing and coupled to the reference frequency generator. The switch circuitry may include one or more switches actuatable by a user of the stylus, wherein at least some of the plurality of reference frequencies are indicative of a state of the one or more switches. The switches may correspond to one or more user-initiateable functions, such as one or more mouse functions.

In some embodiments, the source frequency of the drive signal may be a multiple of each of the reference frequencies. In other embodiments, each of the reference frequencies may correspond to a multiple of the source frequency of the drive signal. The reference frequency generator may include, for example, a frequency divider, such as a digital divider or counter. The reference frequency generator may include a frequency multiplier. In some implementations, the reference frequency generator may include a frequency multiplier and a frequency divider. The reference frequency generator may include one or both of an even harmonic generator circuit and an odd harmonic generator circuit. The reference frequency generator may be configured to include one or both of a full wave rectifier and a square wave generator.

According to further embodiments of the present invention, methods may be implemented in an untethered stylus for use with a location sensor. Such methods may involve receiving a drive signal by the stylus transmitted from the location sensor, and energizing the stylus in response to receiving the drive signal. Methods may also involve generating at the stylus a plurality of reference frequencies based on a source frequency of the drive signal, the plurality of reference frequencies indicative of a plurality of stylus states and synchronized to the source frequency of the drive signal. Methods may further involve mixing the plurality of reference frequencies with the stylus signal for reception by the location sensor, and may involve modulating the stylus signal with the plurality of reference frequencies.

Methods of the present invention may involve generating one or more switch signals each indicative of a state of one or more user-actuatable switches of the stylus, at least some of the plurality of reference frequencies indicative of the one or more switch signals. The switch signals may correspond to one or more user-initiateable functions, such as one or more mouse functions.

The source frequency of the drive signal may be a multiple of each of the reference frequencies. Each of the reference frequencies may corresponds to a multiple of the source frequency of the drive signal. In some implementations, some or all of the reference frequencies may correspond to non-integer frequencies based on the source frequency of the drive signal. Generating the reference frequencies may involve generating one or both of an even harmonic of the source frequency of the drive signal and generating an odd harmonic of the source frequency of the drive signal. Generating the reference frequencies may involve one or both of full wave rectifying the drive signal and generating a square wave using the drive signal.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to methods and systems for communicating data between an untethered stylus and a location sensing system. Embodiments of the present invention provide for communication of analog and/or digital stylus status information between an untethered stylus and a location sensor, such as a digitizer or a touch-sensitive sensor in combination with a digitizer. Communication of stylus status information involves generation of a multiplicity of reference frequencies developed from a source frequency of a drive signal generated by the location sensor.

In a system that utilizes an untethered stylus as a user input device, there is often a need for multiple reference frequencies for communication of information regarding the status of the stylus. For example, a number of switches or sensors provided at the stylus may be subject to a state change, such as by user actuation of a particular switch. Provision of a multiplicity of such reference frequencies allows for the communication of status information from the stylus, along with stylus position information, such as by modulation or direct transmission of such information.

According to various embodiments, apparatuses and methods of the present invention provide for the generation of multiple precision reference frequencies at an untethered stylus which may be easily decoded by a location sensor. Presence or absence of each of the multiplicity of reference frequencies in a stylus signal transmitted from the stylus to the location sensor is preferably indicative of status or change of status of the stylus, such as actuation or non-actuation of a user-actuatable switch of the stylus. The multiplicity of reference frequencies may include frequencies that are divisible from, or multiples of, a source frequency of the drive signal. The multiplicity of reference frequencies may be even or odd harmonic frequencies of the drive signal. Generation of the reference frequencies may involve full wave rectification or square wave generation.

An excitation coil arrangement is provided at the location sensor and employed to produce a magnetic field, such as a continuously varying magnetic field, referred to as a drive signal, in the plane of the location sensor. The stylus includes an antenna arrangement comprising a resonant circuit that is tuned to resonate at the source frequency of the drive signal, and derives power from the drive signal. A reference frequency generator is coupled to, or incorporates, the resonant circuit and is configured to generate a multiplicity of reference frequencies indicative of a multiplicity of stylus states.

A receiver at the location sensor is preferably configured to receive the stylus signal and detect presence or absence of each of the stylus reference frequencies, thereby detecting the status or change in status of the stylus. The receiver at the location sensor may include a demodulator configured to demodulate an amplitude modulated signal received from the stylus and to produce an output signal(s) that includes stylus status information, along with stylus position information. A frequency demodulator may be provided at the location sensor to detect the stylus status information at each of the multiplicity of reference frequencies.

A stylus implemented in accordance with the present invention advantageously provides a low power approach to communicating stylus status information using multiple reference frequencies. Embodiments of the present invention may be implemented using a single low cost integrated circuit that can be configured to generate multiple reference frequencies at the stylus. Such reference frequencies may be precisely synchronized with signals easily reproduced at the receiving circuitry of the location sensor.

Generating multiple reference frequencies at the stylus facilitates the simultaneous communication of multiple types of status information from the stylus, and eliminates the need for oscillator circuitry at the stylus, which may require significant power consumption and moderately complex circuitry. Generation of multiple reference frequencies at the stylus in accordance with the present invention also eliminates the need to recreate the transmitted carrier at the demodulating circuitry of the location sensor.

Figure 1:
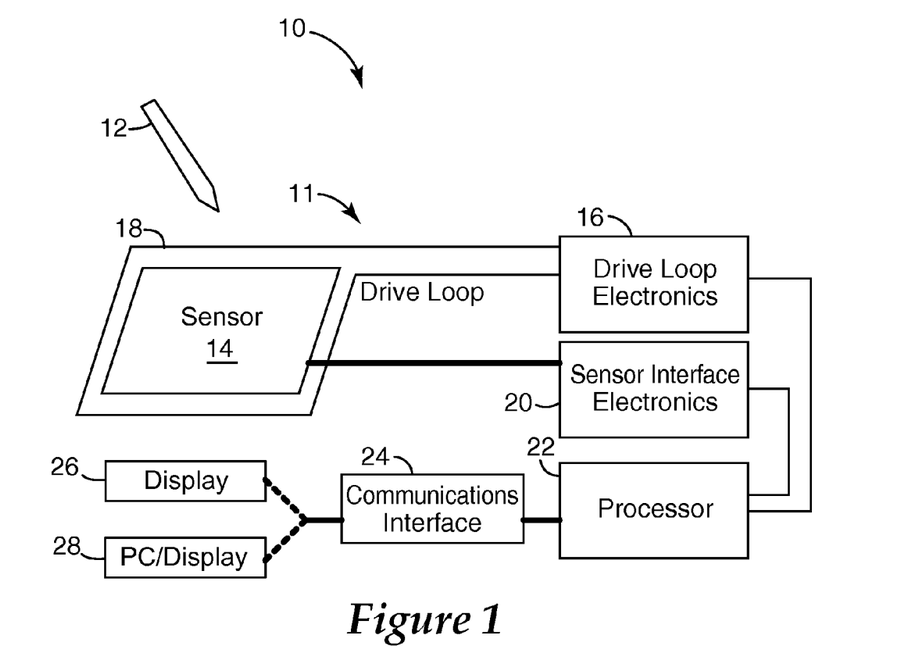
FIG. 1 is a diagram of a location sensing system that includes an untethered stylus and a location sensing device in accordance with embodiments of the present invention.
Figure 2:
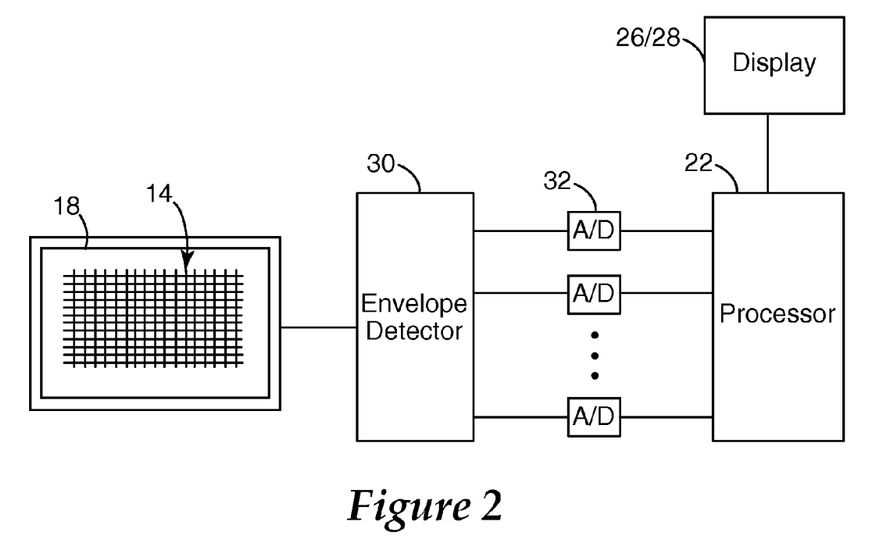
FIG. 2 is a diagram of various components of a location sensing device that cooperates with a stylus in accordance with embodiments of the present invention.
Figure 3:
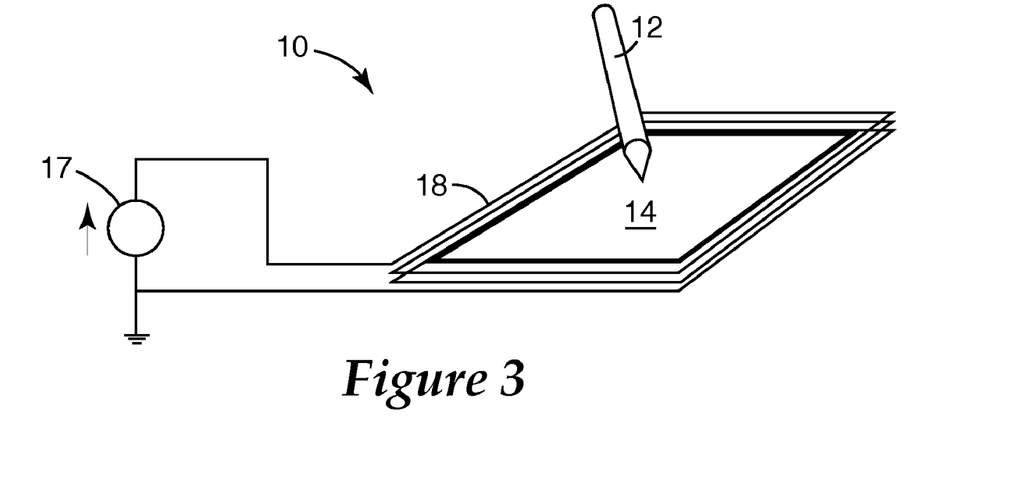
FIG. 3 is a diagram of an apparatus for generating an excitation magnetic field which is received by a stylus in accordance with embodiments of the present invention.

Embodiments of an untethered stylus of the present invention may be implemented in the context of a location sensing system, embodiments of which are illustrated in FIGS. 1-3. According to the embodiments shown in FIGS. 1-3, a location sensing system 10 includes a stylus 12 that interacts with a sensing device 11. The sensing device 11 includes a location sensor 14, such as a digitizer. The stylus 12 is configured as a tetherless or cordless implement that does not have a battery. Rather, the stylus 12 derives power from a magnetic field generated by the sensing device 11. Although preferred embodiments of an untethered stylus do not include a battery, some embodiments may employ a battery, such as a rechargeable battery that is recharged from energy derived from the magnetic field of the drive signal. A battery may be used to provide power to various circuits of the stylus, such as a modulator or pressure sensor (e.g., tip or eraser pressure sensor).

The sensing device 11 is shown to include a drive loop or coil 18 coupled to drive loop electronics 16 that cooperate to generate a magnetic field, which may be a continuously varying magnetic field. One or more coils may be incorporated in the drive coil 18. The stylus 12, having derived power from the magnetic field emanating from the drive coil 18, broadcasts a signal from which stylus location and status may be determined by the sensing device 11.

The stylus 12 is preferably configured to include one or more user-actuatable buttons or switches, such as those commonly employed to implement various mouse functions (e.g., right and left mouse buttons). The tip of the stylus 12 may incorporate a pressure sensor from which applied pressure can be resolved and transmitted to the sensing device 11. Eraser functionality may also be incorporated in the form of a switch or pressure sensor at the stylus end opposite the tip.

Sensor interface electronics 20 is coupled to the sensor 14 and facilitates measurement of signals developed at the sensor 14 in response to signals broadcast by the stylus 12. According to one configuration, the sensor 14 includes a digitizer that incorporates a detection grid and electronics as is known in the art. For example, such a detection grid may include pairs of position resolving conductors each of which forms one or more differential coil elements in the sensor 14, with each conductor pair receiving a magnetic signal transmitted by the stylus 14. An illustrative example of a digitizer having such a detection grid configuration, elements of which may be employed in a location sensor system of the present invention, is disclosed in U.S. Pat. Nos. 4,786,765; 5,218,174; 5,633,471; 5,793,360; 6,667,740; and 7,019,672; which are hereby incorporated herein by reference.

According to another configuration, the sensing device 11 may incorporate a sensor 14 that effectively incorporates a digitizer and a touch-sensitive sensor. The digitizer, according to this configuration, allows the location and status of the stylus 12 to be determined. The touch-sensitive sensor allows the location of a finger touch to be determined. This configuration allows a user to use either the stylus 12 or a finger to indicate a desired location on a computer display, as well as determine the location and status of the stylus 12.

The touch-sensitive sensor 14 typically includes a matrix that capacitively couples to the stylus 12 and/or a finger. In this configuration, the sensor 14 of the sensing device 11 is preferably made up of a series of transparent conductors placed upon a glass or plastic cover that can be placed in front of an LCD display. One side of the glass or plastic sheet has conductors in the X direction, and the opposite side has conductors in the Y direction. Examples of suitable touch-sensitive sensors 14 are disclosed in commonly owned U.S. Pat. Nos. 6,133,906 and 6,970,160, in commonly owned U.S. Published Application No. 2005/0083307, in U.S. Pat. Nos. 6,762,752 and 6,690,156, and in U.S. Published Application No. 2004/0095333, each of which is hereby incorporated herein by reference.

An embodiment that incorporates a digitizer and touch-sensitive sensor advantageously allows a user to point a stylus at a computer display and have the location and status of the pointing device determined and, when a finger is used to point at the display device, allows for the determination of the location of a finger touch at the display device. The dual use aspects of this embodiment of a sensing device 11 make it particularly useful in tablet PC applications.

For example, a digitizer arrangement allows a user to use a stylus to input information, indicate operations the user wants to take, and write or draw on the display. The touch-sensitive sensor allows the user to "type" information onto a virtual keyboard on the display screen, for example. This would allow the vendor of the computing system, in which a dual touch location sensor system of the present invention is implemented, to eliminate the keyboard and the associated bulk it requires. It is understood that a digitizer and a touch-sensitive sensor need not be implemented together in all configurations, but inclusion of both sensing devices provides for enhanced user interaction with a computing system that incorporates a sensing system 10 of the present invention.

According to one embodiment, the drive coil 18 may be constructed of wire, such as 36 gauge wire, looped several times (e.g., 4 times) around the periphery of the frame of sensing device 11. In one implementation, the drive coil 18 may have an inductance of about 21 µH and an impedance of about 14 Ohms at 100 kHz. The drive coil 18 is connected to a signal generator of the drive loop electronics 16. The signal generator may be configured to produce 200 periods of a 100 kHz sine wave signal gated at 250 Hz. The signal generator may, for example, produce an output signal of 0.4 $V_{pp}$, resulting in approximately 28 mA of current that flows in the drive coil 18.

FIG. 3 is a simplified illustration of drive coil 18 and a signal generator 17 that cooperate to generate a magnetic excitation field. In this illustrative example, one or more coils are preferably arranged in the plane of the location sensor. A sinusoidal current is produced by the signal generator 17 with peak magnitude $A_1$ at radian frequency $\omega_1$ and is applied to the rectangular coil 18.

The stylus 12 is configured to collect energy from the magnetic field generated by drive coil 18/drive loop electronics 16 using a tank circuit. The tank circuit is preferably tuned to resonate at the frequency that the drive coil 18 is driven. In this illustrative example, the frequency is set at 100 kHz. The tank circuit of the stylus 12 builds amplitude during the burst produced by the drive coil 18 and then gradually loses signal amplitude after the drive coil 18 is turned off. The time associated with the exponential charging and discharging of the resonant tank circuit of the stylus 12 is determined by the capacitive and inductive elements in the tank circuit.

Referring again to FIG. 1, the sensor interface electronics 20 is preferably connected to the sensor 14 via a shielded connector. The sensor interface electronics 20 includes circuitry for measuring the signal levels present on the individual traces of the sensor 14, and is typically configured to reject as much noise as possible.

As is shown in FIG. 2, an envelope detector circuit 30 of the sensor interface electronics 20 is configured to detect signals developed on individual traces of the sensor 14. The signals output by the envelope detector circuit 30 are digitized by use of analog-to-digital (A/D) converters 32. Each trace of the sensor 14 may have a dedicated A/D converter 32. Alternatively, two or more traces may share a common A/D converter 32 via a switch having a sufficient switching frequency. The envelope detector circuit 30 is configured to provide sufficient gain to make the resultant signal match the requirements of A/D converters 32. The envelope detector circuit 30 may be configured to generate a signal having the same shape as an imaginary line describing the upper bound of the sensor signal. In such a configuration, the envelope detector circuit 30 effectively transforms the 100 kHz signal into a DC or low frequency signal that is more readily digitized. The envelope detector circuit 30 preferably incorporates one or more synchronous demodulators.

A processor 22 is coupled to the drive loop electronics 16, sensor interface electronics 20, and a communications interface 24, as is shown in FIG. 1. The processor 22 coordinates the operations of drive loop electronics 16 and sensor interface electronics 20, and is configured to determine stylus/finger location and stylus status. Stylus/finger location and stylus status determinations may be made by the processor 22 using known approaches, such as those discussed in the patent references incorporated herein by reference. In one embodiment, processor 22 determines stylus/finger location and stylus status in accordance with the methodologies disclosed in commonly owned U.S. Patent Application Publication US 2008/0106520 (Free et al.), which is hereby incorporated herein by reference.

The location and status information computed by the processor 22 is communicated to a computer and/or display 26 via a communications interface 24. The communications interface 24 may be configured as an RS-232 or USB interface, for example. The processor 22 may be configured to drive a display 26 directly. Alternatively, a computer 28 may be coupled to the communications interface 24 and receive the location and status information from the processor 22, and drive its display. The processor 22 or computer 28 may be configured to control cursor velocity, momentum and other factors to enhance the user experience with the sensing system 11.

Figure 4:
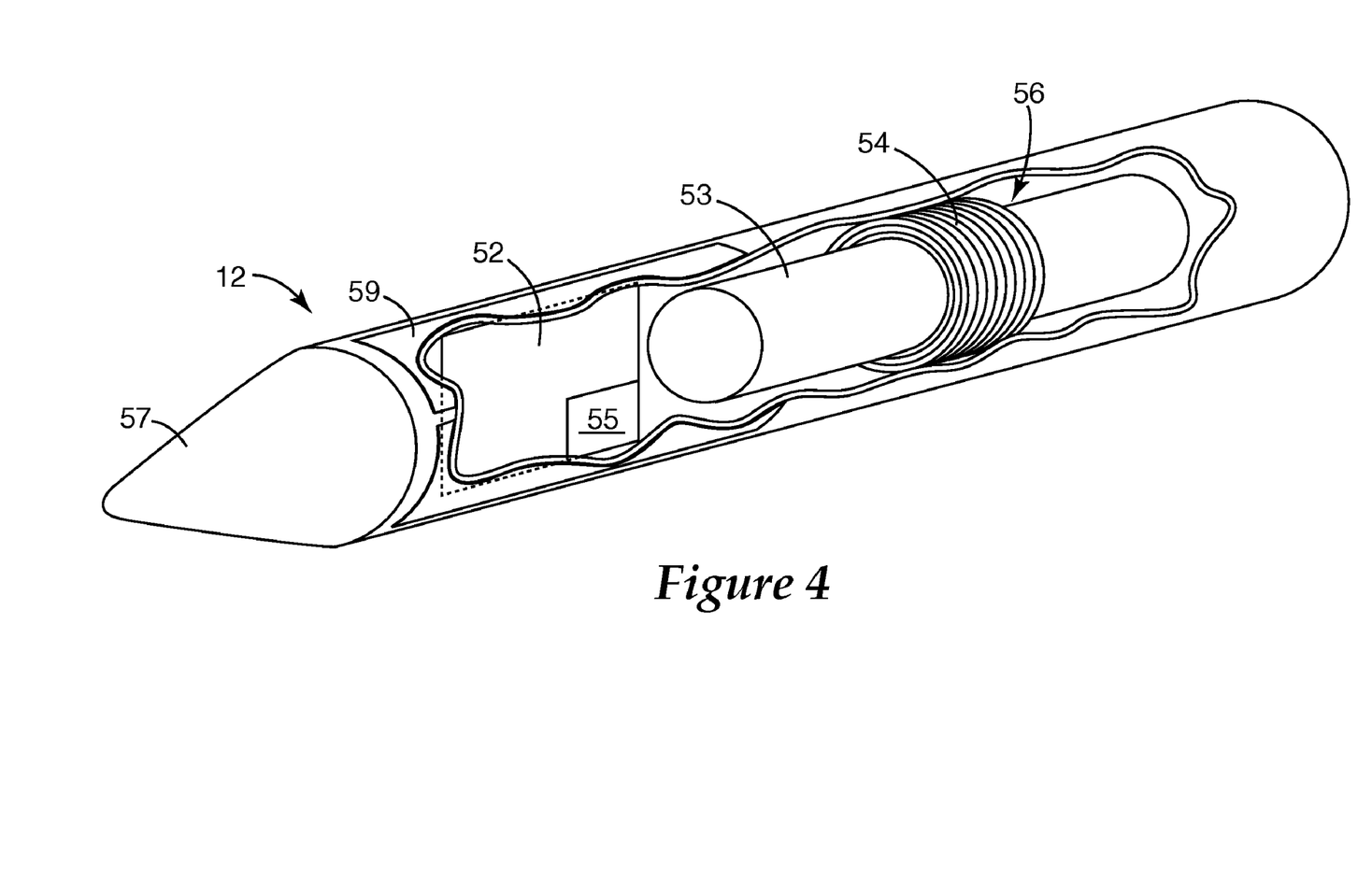
FIG. 4 is an illustration of various components of a stylus implemented in accordance with embodiments of the present invention.

Referring now to FIG. 4, there is shown an embodiment of an untethered stylus 12 of the present invention that may be implemented in the context of a location sensing system as described above or other sensing system known in the art. In accordance with the embodiment shown in FIG. 4, a stylus 12 houses electronics 52, which includes a reference frequency generator 55, and a coil 54 wrapped around a ferrite cylinder 53. The ferrite cylinder 53 serves to increase signal amplitude. An applied harmonic magnetic field produced at the surface of the location sensor (e.g., digitizer) or a display, for example, couples flux through the ferrite cylinder 53 and thus to the coil 54 when the stylus 12 is placed in the applied field.

The ferrite coil arrangement 56 resonates with a separate parallel-connected capacitor of the electronics 52 or the reference frequency generator 55 and is tuned to the excitation field frequency. The parallel coil-capacitor combination is connected between the stylus tip 57 and the stylus shield 59. The shield 59 may form part of, or otherwise be connected to, the stylus housing so that it can be touched, and therefore grounded, by a user's hand when held. The shield 59 may be situated to extend over the circuitry region of the stylus 12, and preferably has a discontinuous shape, such as a "C" shape, so as to avoid eddy currents that could otherwise arise in a closed loop shield arrangement.

The stylus tip 57 couples capacitively to the location sensor from which location information is derived. To provide stylus status information, the ferrite coil arrangement 56 powers the electronics 52, including the reference frequency generator 55, which amplitude modulates the stylus tip voltage at the reference frequency or frequencies. The frequency of the oscillations is changed to reflect the stylus status, such as switch closures or tip pressure changes.

Alternatively, the invention may be implemented with magnetic-sensing digitizer systems as are known in the art. An untethered magnetic stylus is similar to the capacitive stylus shown in FIG. 4, except the resonant circuit comprising ferrite coil arrangement 56 and separate parallel-connected capacitor of the electronics 52 need not be connected to tip 57 nor to a shield 59. Untethered magnetic styluses are well known in the art, and are described in previously incorporated U.S. Pat. Nos. 4,786,765; 5,633,471; 5,793,360; 6,667,740, and 7,019,672. Embodiments of the present invention that are implemented using an untethered magnetic stylus may employ a location sensor that includes multiple drive loops as disclosed in the referenced patents. In such embodiments, a separate sensing grid and separate drive loops need not used. Rather, each of the drive loop coils is alternately coupled to transmitting circuitry and then to receiving circuitry to alternately transmit and receive from one of multiple drive loop coils that are placed in the active area, typically under the display.

Figure 5:
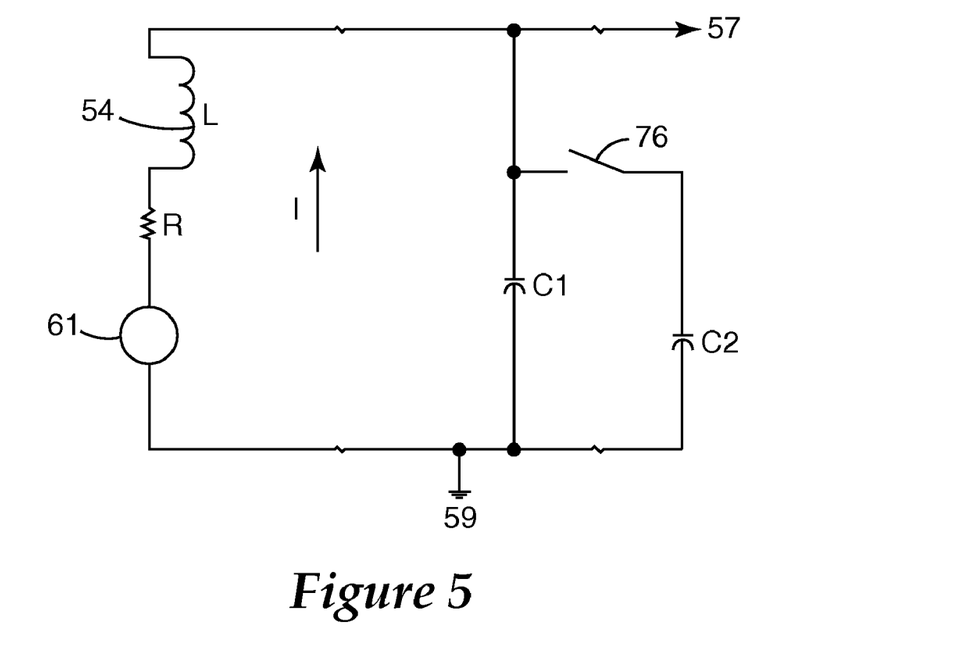
FIG. 5 shows a schematic model of a parallel coil-capacitor circuit that may be incorporated in a stylus of the present invention.

FIG. 5 shows a schematic model of a parallel coil-capacitor circuit that facilitates an enhanced understanding of the present invention. The parallel coil-capacitor circuit shown in FIG. 5 may be incorporated in a stylus as part of, or coupled to, reference frequency generator circuitry in accordance with the present invention. FIG. 5 shows a capacitor C1 connected in parallel with a coil 54 to resonate at the excitation frequency or the transmitted frequency. The voltage developed across the coil 54, which is shown modeled as voltage generator 61, is coupled to the stylus tip 57 and then capacitively coupled to the location sensor, such as sensor 14 shown in FIG. 1. The voltage developed across the resonating coil 54 is modulated with one or a combination of the techniques discussed below. An added ferrite cylinder 53 about which coil 54 is preferably wrapped, as shown in FIG. 5, has the effect of increasing the magnetic flux B and signal coupled by the drive coil of the location sensor to the receiving coil 54 of the stylus 12.

The capacitance value of capacitor C1 shown in FIG. 5 is selected such that the capacitance, C, of capacitor C1 resonates with the coil inductance, L, at the excitation angular frequency $\omega$ so that there is no voltage drop across the LC combination. Two different voltages in this circuit can be considered. The first voltage of consideration is the voltage V (shown in terms of voltage source 61) that develops across the coil 54 through magnetic induction. It is well understood that this voltage 61 is basically equal to the number of stylus coil turns N times the coil cross section A times the rate of change of the magnetic flux density passing through the ferrite cylinder, which is given by $V=N*A*dB/dt$.

The second voltage of consideration is the voltage that develops across the capacitor C1. This voltage $V_C$ is also the stylus tip voltage. From basic circuit analysis at resonance, it follows that: $V_C=V/(\omega RC)=V(\omega L/R)$ with the quantity $1/(\omega RC)=(L\omega)/R$ defined as the resonant circuit quality factor Q, where $\omega$ is expressed in terms of radians per second. As will be discussed below, this second voltage is modulated for purposes of communicating stylus status data to a location sensor.

With continued reference to FIG. 5, one approach to transmitting stylus status information in addition to stylus position information is through addition of a second capacitor C2 connected to the first capacitor C1 through a switch 76. Opening and closing the switch 76 causes the resonance frequency of the coil-capacitor combination 54/C1 to change. This change may be detected by observing a change in phase of the stylus transmitted frequency or a transient frequency change caused when the drive coil current is turned off.

This method of data transmission, however, is not suitable for a stylus powered by a constantly varying magnetic field and capacitively coupled to the digitizer. Constant excitation does not allow a transient measurement of the stylus resonance, and phase modulation is difficult to detect as the phase of the digitizer received signal varies dramatically as the stylus is moved across the location sensor (e.g., digitizer). Frequency modulation of an amplitude-modulated signal using multiple reference frequencies generated at the stylus in accordance with the present invention removes these difficulties. The location sensor may be configured to demodulate the amplitude modulation and detect the reference frequencies of the modulation.

Figure 6:
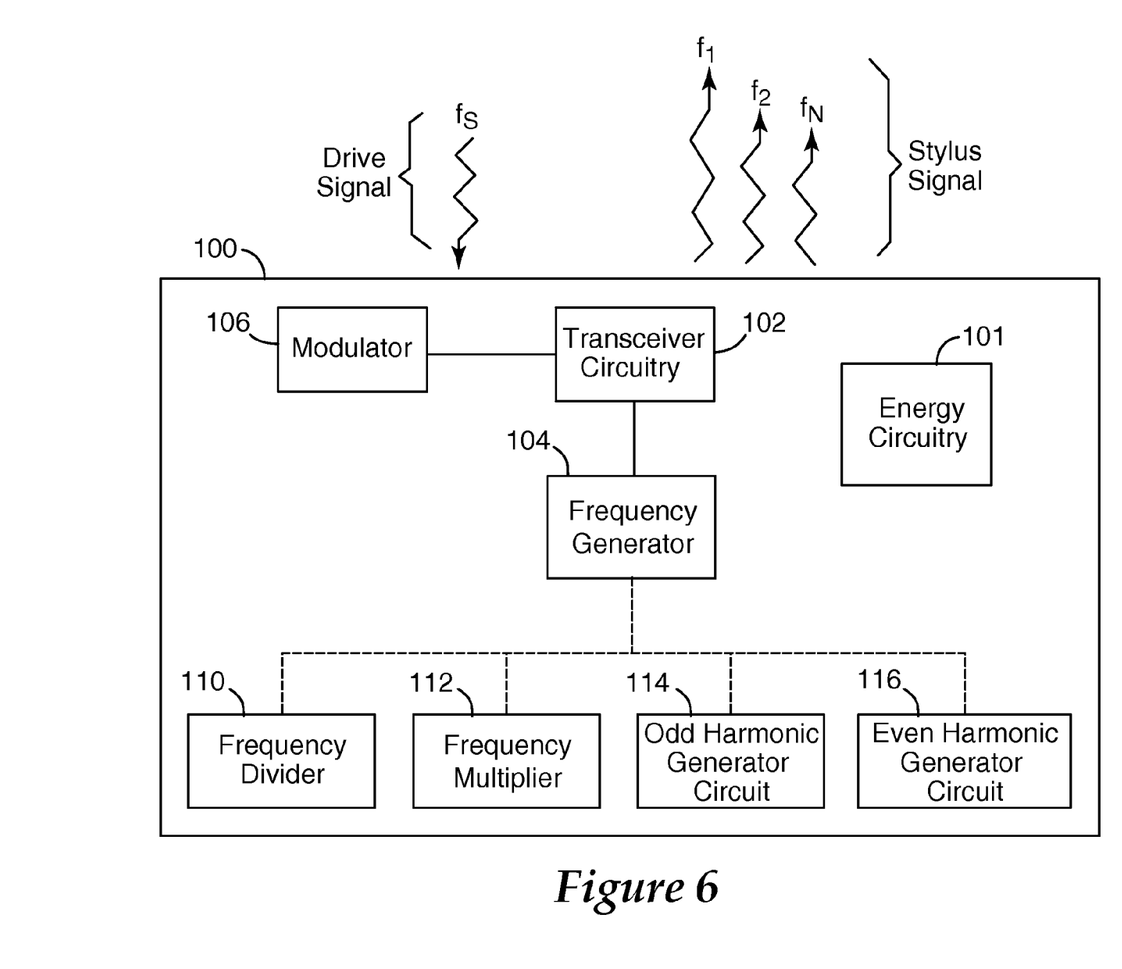
FIG. 6 is a block diagram of circuit components that may be incorporated in a stylus that cooperate to generate a multiplicity of reference frequencies indicative of a multiplicity of stylus states in accordance with embodiments of the present invention.

FIG. 6 is a block diagram of circuit components 100 that may be incorporated in a stylus that cooperate to generate a multiplicity of reference frequencies indicative of a multiplicity of stylus states in accordance with embodiments of the present invention. As is shown in FIG. 6, a drive signal comprising a single source frequency, $f_s$, is generated by a location sensor and received by transceiver circuitry 102 of the stylus. Operating on the drive signal with single source frequency, $f_s$, as a reference, the circuit components 100 cooperate to generate a stylus signal that comprises a multiplicity of reference frequencies, shown as frequencies $F_1, F_2, \ldots, F_n$. The stylus signal typically includes stylus position information mixed with signal components associated with the generated reference frequencies.

As is further shown in FIG. 6, a frequency generator 104 is coupled to the transceiver circuitry 102. The frequency generator 104 may be configured in several ways. According to one implementation, the frequency generator 104 includes a frequency divider 110. The frequency divider 110 is preferably configured to divide down a source signal of a given source frequency. For example, a source signal having a frequency of 96 KHz may be divided down to 48 KHz, which may be AM modulated (via modulator 106) with 12 KHz and 6 KHz reference frequencies each indicative of a different stylus state (e.g., the state of two different stylus switches).

According to another implementation, the frequency generator 104 includes a frequency multiplier 112. The frequency multiplier 112 is preferably configured to generate frequencies that are multiples of a given source frequency. Reference frequencies, indicative of different stylus states, may be generated by the frequency multiplier 112 that are multiples of the source signal frequency. A source signal may then be AM modulated (via modulator 106) with the various reference frequencies each indicative of a different stylus state.

In accordance with further implementations, the frequency generator 104 may include an odd harmonic generator circuit 114 and/or an even harmonic generator circuit 116. Odd and/or even harmonics of the source signal frequency may be generated by harmonic generator circuits 114, 116. Reference harmonic frequencies, indicative of different stylus states, may be generated by the harmonic generator circuits 114, 116. A source signal may then be AM modulated (via modulator 106) with the various reference harmonic frequencies each indicative of a different stylus state. Power is supplied to active components of the stylus by energy circuitry 101, which may include a tank circuit of a type previously described with reference to FIG. 5. It is understood that the frequency generator 104 may include a combination of the frequency generating components 110, 112, 114, 116 shown in FIG. 5.

Figure 7:
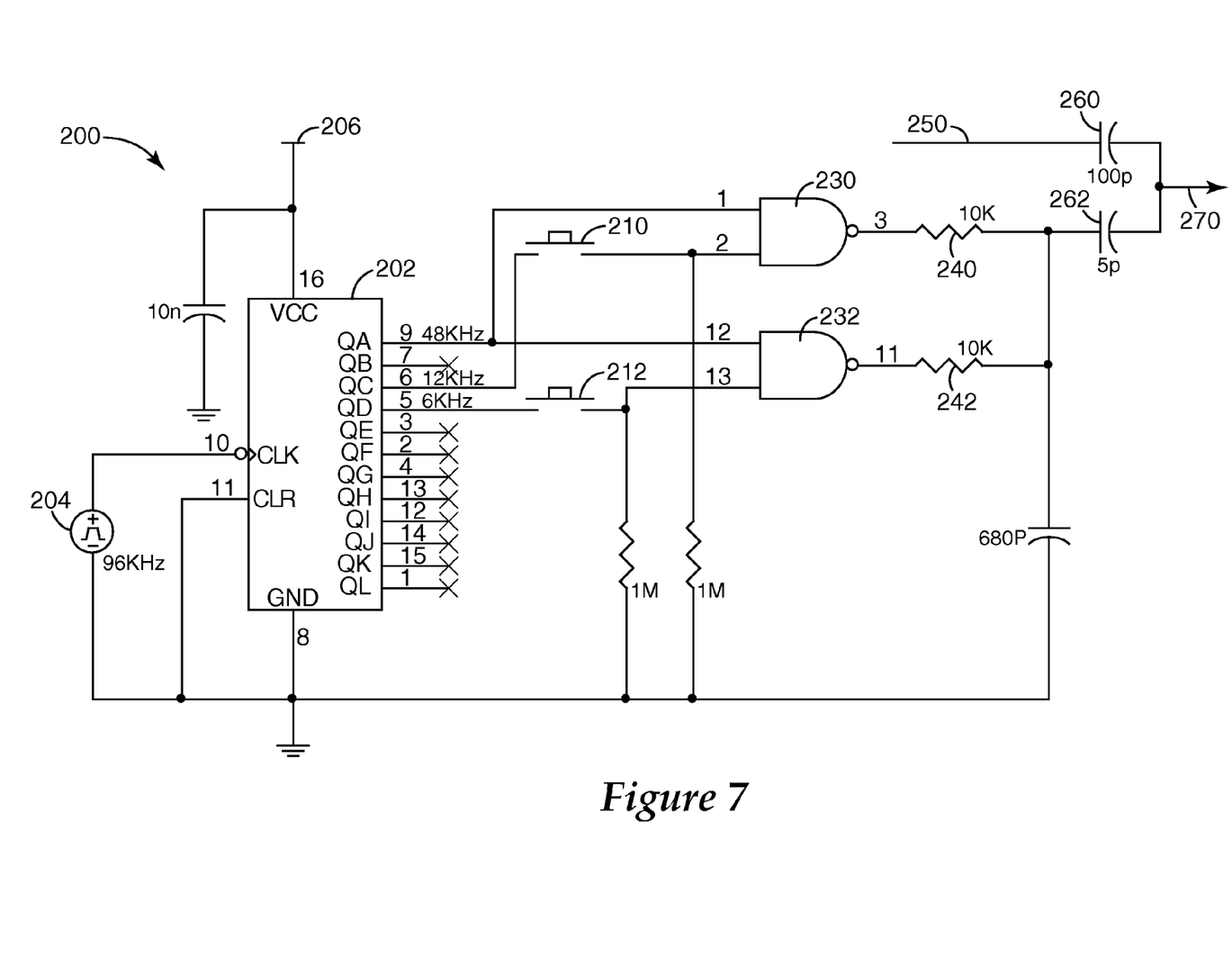
FIGS. 7-9 are schematics of frequency generators for use in a stylus in accordance with embodiments of the present invention.

FIG. 7 is a schematic of a frequency generator implemented as a frequency divider in accordance with an embodiment of the present invention. The frequency divider circuit 200 shown in FIG. 7 includes a frequency counter/divider circuit 202 having a clock input, CLK, coupled to a voltage generator 204. The voltage generator 204 is preferably implemented using a tank circuit of the type shown in FIG. 5. The frequency of the voltage generator 204 is preferably the frequency to which the tank circuit is tuned to resonate, preferably that of the drive signal. In this illustrative example, it is assumed that the voltage generator 204 generates a signal having a voltage V1 at 96 KHz.

A reset (CLR) input and a ground (GND) input of the frequency counter/divider circuit 202 are respectively coupled to ground. A power input (VCC) of the frequency counter/divider circuit 202 is coupled to a power source 206. In one implementation, the power source 206 is coupled to, and derives power from, the tank circuit, such as that shown in FIG. 5. The tank circuit may include an AC-to-DC converter to which the power input (VCC) of the frequency counter/divider circuit 202 may be coupled. The ground input (GND) of the frequency counter/divider circuit 202 may be coupled to the shield of the stylus.

Using the source signal of V1 at 96 KHz applied to the CLK input, the frequency counter/divider circuit 202 provides signals of 48 KHz, 12 KHz, and 6 KHz at respective outputs QA, QC, and QD. Output QA is coupled to one input of each of NAND gates 230 and 232, presenting a 48 KHz signal at these inputs. The second input of NAND gate 230 is coupled to switch 210. Switch 210 is also coupled to output QC of the frequency counter/divider circuit 202. The second input of NAND gate 232 is coupled to switch 212. Switch 212 is also coupled to output QD of the frequency counter/divider circuit 202. When switch 210 is closed, a 12 KHz signal is presented at the second input of NAND gate 230. When switch 212 is closed, a 6 KHz signal is presented at the second input of NAND gate 232.

Signals developed at the outputs of NAND gates 230 and 232 are coupled the stylus tip 270 via resistors 240 and 242, respectively. A tip drive signal 250, which is typically used to determine stylus position, is mixed with the 48 KHz signal (as modulated by the 12 KHz and/or 6 KHz signals) via capacitors 260 and 262, respectively. In this manner, the 96 KHz source signal is divided down to a 48 KHz signal. This 48 KHz signal is AM modulated with 12 KHz and/or 6 KHz when switch 230 and switch 232 are respectively closed (e.g., depressed by the user).

In one embodiment, the frequency counter/divider circuit 202 may be implemented using a digital frequency counter/divider, such as a CMOS ripple-carry binary counter/divider, model CD4040, available from Texas Instruments. NAND gates 230 and 232 may be implemented using a NAND buffered gate, such as a quad 2-input NAND buffered gate, model CD4011, available from Fairchild Semiconductor Corporation.

According to other embodiments, a frequency generator implemented in a stylus of the present invention may include components that provide for a combination of frequency generating functionality. Embodiments of a frequency generator may incorporate frequency multiplication and frequency division components. For example, frequency generation circuitry of the present invention may incorporate a frequency multiplier circuit that multiplies a source frequency by 2 and a counter/divider circuit that divides this twice-multiplied source frequency signal by 3, thereby achieving a divider ratio of 1.5 (i.e., a non-integer frequency based on the source frequency). Reversing the order of multiplication and division operations provides for a ratio of 2/3. Those skilled in the art will understand that other combinations of multiplying and dividing components may be selected to provide a multiplicity of reference frequencies that are indicative of a multiplicity of stylus states.

Figure 8:
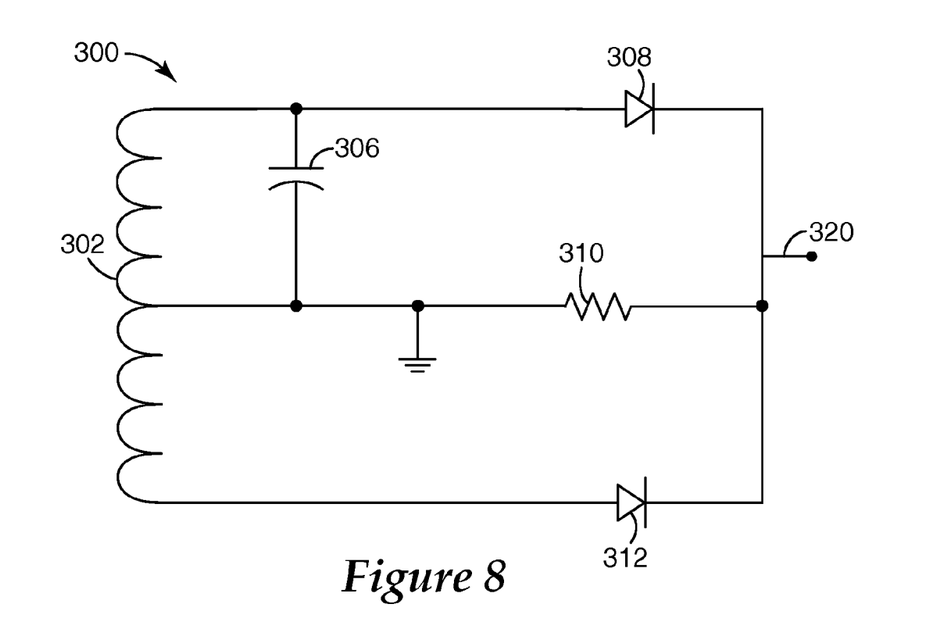
Figure 9:
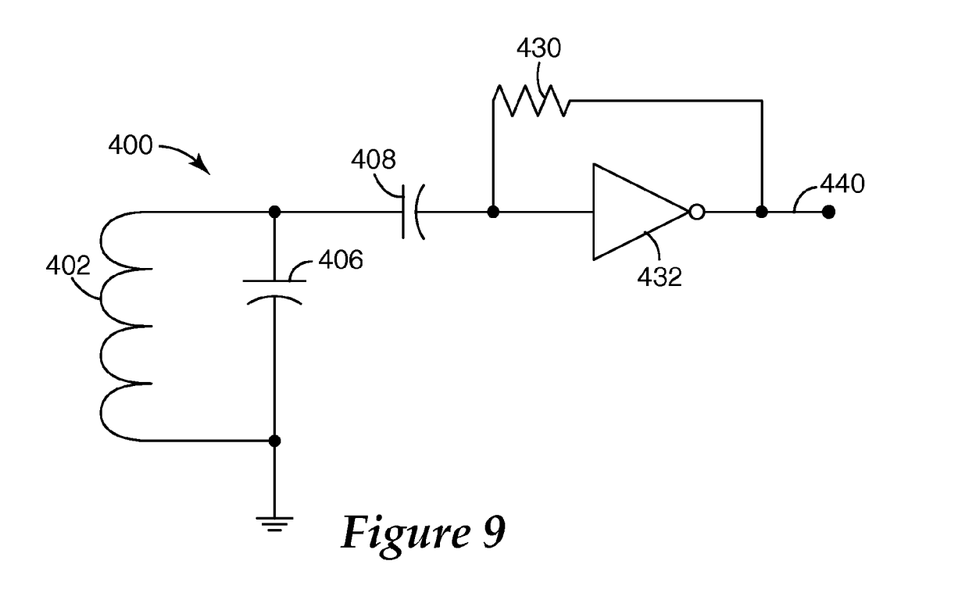

FIGS. 8 and 9 are schematics of circuits that may be implemented in a stylus of the present invention for generating higher harmonic reference frequencies. The circuit 300 shown in FIG. 8 is a full wave rectifier that generates a second harmonic of a source signal. The circuit 300 includes a coil 302 and a capacitor 306 that operate as a parallel coil-capacitor combination of a tank circuit. Diodes 308, 312 and resistor 310 are shown coupled to the coil 302 and ground in a conventional manner. A full wave rectified signal is developed at the output 320 of circuit 300, which has a frequency equal to the second harmonic of the drive signal frequency. It is noted that the resistor, 310, loads the tank circuit and damps the Q of the circuit. A self biasing compare circuit may be coupled at the output node if desired.

The circuit 400 shown in FIG. 9 includes a coil-capacitor combination of a tank circuit comprising coil 402 and capacitor 406. Circuit 400 further includes a square wave generator comprising in inverter 432 whose output is tied to its input via resistor 430. The square wave generator is coupled to the coil-capacitor combination 402, 406 via capacitor 408, which provides a sinusoid signal of frequency $f_s$, developed from the drive signal. The sinusoidal signal input to the square wave generator is clipped so as to produce a square wave having odd harmonic content defined by $V_{n\text{-}odd} = K\, 1/N\, \sin(2\pi N f_s)$. If needed or desired, a selective filter may be added to amplify the harmonic(s) of choice.

Various known amplitude demodulation circuitry may be provided at the location sensor to detect the amplitude modulation in the stylus signal. Known frequency demodulation circuitry at the location sensor may be used to detect the frequencies of the amplitude modulation.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An untethered stylus configured to cooperate with a location sensor, the location sensor configured to generate a drive signal, the stylus comprising:
   a housing;
   transceiver circuitry disposed in the housing, the transceiver circuitry configured to receive the drive signal and transmit a stylus signal for reception by the location sensor;
   energy circuitry disposed in the housing and energized by the drive signal; and
   a reference frequency generator disposed in the housing and coupled to the transceiver circuitry and energy circuitry, the reference frequency generator configured to generate a plurality of reference frequencies based on a source frequency of the drive signal, the plurality of reference frequencies indicative of a plurality of stylus states and synchronized to the source frequency of the drive signal, wherein the transceiver circuitry is configured to mix all of the plurality of reference frequencies with the stylus signal at a same point in time.

2. The stylus of claim 1, further comprising switch circuitry supported by the housing and coupled to the reference frequency generator, the switch circuitry comprising one or more switches actuatable by a user of the stylus, at least some of the plurality of reference frequencies indicative of a state of the one or more switches.

3. The stylus of claim 2, wherein the one or more switches correspond to one or more user-initiateable functions.

4. The stylus of claim 2, wherein the one or more switches correspond to one or more mouse functions.

5. The stylus of claim 1, wherein the transceiver circuitry is configured to modulate the stylus signal with the plurality of reference frequencies.

6. The stylus of claim 1, wherein the source frequency of the drive signal is a multiple of each of the plurality of reference frequencies.

7. The stylus of claim 1, wherein each of the plurality of reference frequencies corresponds to a multiple of the source frequency of the drive signal.

8. The stylus of claim 1, wherein the reference frequency generator comprises a frequency divider.

9. The stylus of claim 1, wherein the reference frequency generator comprises a digital divider.

10. The stylus of claim 1, wherein the reference frequency generator comprises a frequency multiplier.

11. The stylus of claim 1, wherein the reference frequency generator comprises a frequency multiplier and a frequency divider.

12. A method implemented in an untethered stylus for use with a location sensor, comprising:
   receiving a drive signal by the stylus transmitted from the location sensor; energizing the stylus in response to receiving the drive signal; generating at the stylus a plurality of reference frequencies based on a source frequency of the drive signal, the plurality of reference frequencies indicative of a plurality of stylus states and synchronized to the source frequency of the drive signal; and mixing all of the plurality of reference frequencies with the stylus signal at a same point in time for reception by the location sensor.

13. The method of claim 12, comprising generating one or more switch signals each indicative of a state of one or more user-actuatable switches of the stylus, at least some of the plurality of reference frequencies indicative of the one or more switch signals.

14. The method of claim 13, wherein the one or more switch signals correspond to one or more user-initiateable functions.

15. The method of claim 13, wherein the one or more switch signals correspond to one or more mouse functions.

16. The method of claim 12, comprising modulating the stylus signal with the plurality of reference frequencies.

17. The method of claim 12, wherein the source frequency of the drive signal is a multiple of each of the plurality of reference frequencies.

18. The method of claim 12, wherein each of the plurality of reference frequencies corresponds to a multiple of the source frequency of the drive signal.

19. The method of claim 12, wherein at least some of the plurality of reference frequencies corresponds to non-integer frequencies based on the source frequency of the drive signal.

20. An apparatus implemented in an untethered stylus for use with a location sensor, comprising:
   a receiver configured to receive a drive signal at the stylus transmitted from the location sensor; a power circuit provided at the stylus and energized in response to receiving the drive signal; means, coupled to the receiver and power circuit, for generating at the stylus a plurality of reference frequencies based on a source frequency of the drive signal, the plurality of reference frequencies indicative of a plurality of stylus states and synchronized to the source frequency of the drive signal; and a transmitter coupled to the generating means and configured to mix all of the plurality of reference frequencies with the stylus signal at a same point in time.

21. The apparatus of claim 20, further comprising switch circuitry coupled to the generating means, the switch circuitry comprising one or more switches actuatable by a user of the stylus, at least some of the plurality of reference frequencies indicative of a state of the one or more switches.

* * * * *

UNITED STATES PATENT AND TRADEMARK OFFICE
CERTIFICATE OF CORRECTION

PATENT NO. : 8,040,330 B2  
APPLICATION NO. : 11/617312  
DATED : October 18, 2011  
INVENTOR(S) : Karl Hauck

Page 1 of 1

It is certified that error appears in the above-identified patent and that said Letters Patent is hereby corrected as shown below:

On The Title Page:
Item (54) Title, delete "EMPOLYING"
and insert --EMPLOYING-- therefor.

In The Specifications:
Column 1
Line 1, delete "EMPOLYING" and insert --EMPLOYING-- therefor.

Signed and Sealed this
Twentieth Day of December, 2011

David J. Kappos
*Director of the United States Patent and Trademark Office*